No. 832,878. PATENTED OCT. 9, 1906.
J. KOŠTÁLEK.
PARALLEL FILTER.
APPLICATION FILED APR. 1, 1904.
2 SHEETS—SHEET 2.
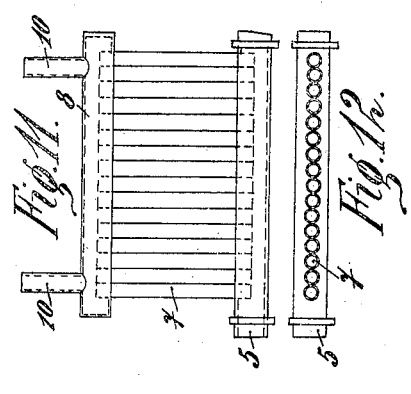
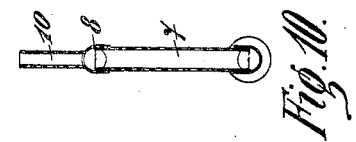
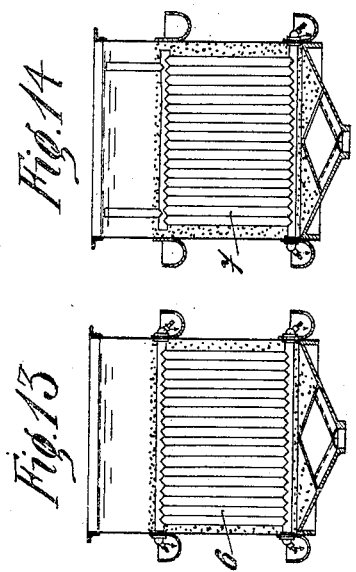
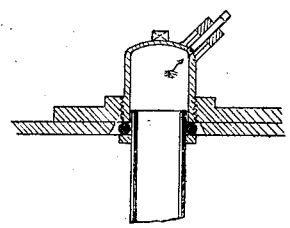
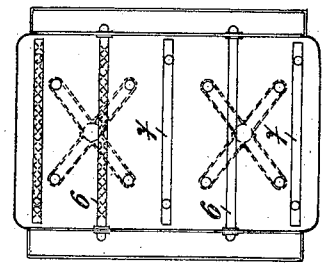
Witnesses.
Inventor
Josef Koštálek
by B. Singer atty.

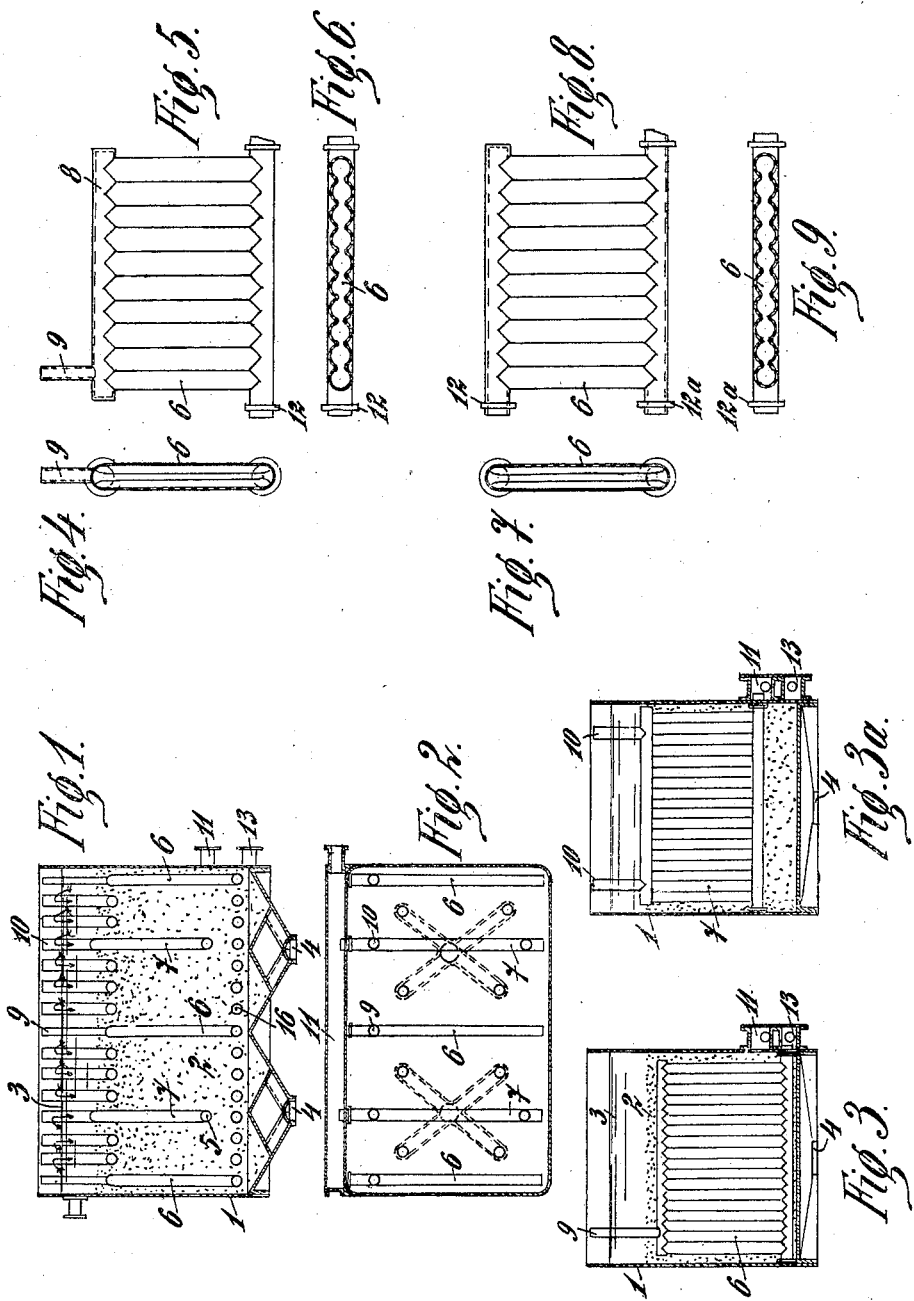

UNITED STATES PATENT OFFICE.

JOSEF KOŠTÁLEK, OF PRAGUE, AUSTRIA-HUNGARY.

PARALLEL FILTER.

No. 832,678.   Specification of Letters Patent.   Patented Oct. 9, 1906.

Application filed April 1, 1904. Serial No. 201,151.

*To all whom it may concern:*

Be it known that I, JOSEF KOŠTÁLEK, a subject of the Emperor of Austria-Hungary, residing in Vinohrady No. 1084, Prague, Austria-Hungary, have invented a new and useful Parallel Filter, of which the following is a specification.

This invention relates to improvements in parallel gravity-filters in which the filtering medium is traversed by the liquid at every point which is to be filtered with one and the same velocity, and has for its objects the provision of means whereby an increase in the filtering-surface of mechanical filters, an increase in the speed of filtration, an easy removal or insertion of the filtering mechanism, a simple and efficient filter capable of operating in the manner set forth, and a ready cleansing of the entire mechanism and the discharge of the filtering medium may be secured.

In Letters Patent No. 737,850, issued to me under date of September 1, 1903, there was shown a filter equipped with inlet and outlet tubes shouldered into apertures in order to form, respectively, ingress and egress collecting-tubes for respectively filtered and unfiltered juices.

To the end that the advantages of my invention may be secured, it is proposed to add to the features of the aforesaid patent perforated inlet and outlet pockets constructed by joining suitable tubes with corrugated metal sheets or sheets of wire-gauze and disposing such inlet and outlet pockets within the filtering medium of a gravity-filter in convenient numbers and at suitable distances from one another. It is proposed to place such pockets, each designed to perform service as either inlet or outlet pockets, in pairs and parallel to one another, the inlet-pocket occupying a position midway between two outlet-pockets, so that one filter element shall be constituted of one inlet and two outlet pockets equidistant from one another and disposed approximately perpendicular to one plane. I attain these objects by the mechanism illustrated in the accompanying drawings, in which—

Figure 1 is a vertical section of a parallel gravity-filter. Fig. 2 is a horizontal section and top view of the same. Fig. 3 is a vertical section of an outlet-pocket 6. Fig. 3ª is a vertical section of an inlet-pocket 7. Figs. 4, 5, and 6 show an outlet-pocket with a collecting-tube for filtered fluid fitted at the front of the pocket. Figs. 7, 8, and 9 show the same pocket fitted with upper and lower collecting-tubes. Figs. 10, 11, and 12 show an inlet-pocket with a sediment-collecting tube fitted at the foot of the pocket. Figs. 13, 14, and 15 show a parallel gravity-filter with a modified form of inlet and outlet pocket 6 and 7, and Fig. 16 shows in detail the construction of the stoppers with which modified pockets 17 and 18 are equipped.

Similar figures refer to similar parts throughout the several views.

Referring to Figs. 1 to 12, inclusive, 1 is a filtering-reservoir. It is filled with a granular filtering material, preferably sand, which is traversed by the liquid to be filtered—for instance, sugar-juices—with a velocity such that the flow of the liquid remains the same in every point. The juice or liquid to be filtered flows from the inlet-pocket 7 to the perforated outlet-pocket 6, being discharged from the latter by the lower collecting-tube 12, Fig. 4, into the juice-discharge gutter 13. The gravity-filter being equipped with inlet and outlet tubes, as described in Letters Patent No. 737,850, in addition to the proposed device of this invention, it follows that a discharge of filtered material from tubes 16, Fig. 1, into said gutter 13 also takes place.

The fluid to be filtered after having completely saturated the granular filtering medium can enter an inlet-pocket by means of open cap-tube 10 or through upper collecting-tube 8, Fig. 11, of said inlet-pocket. From here it traverses the filtering medium 2, lying to either side of said inlet-pocket, until it reaches the perforated or meshed metal walls or partitions of the outlet-pocket 6. Here it descends to be collected in and discharged from the collecting-tube 12 of said outlet-pocket 6. Upright tube 9 of said outlet-pocket serves as an escape for any air that may collect in said pocket. Tube 8, Fig. 5, of the outlet-pocket is perforated and serves as an upper collection-tube identically as does the similarly-numbered tube of the inlet-pocket, Fig. 11. The lower tube 5, Fig. 11, of the inlet-pocket serves as a collection tube or reservoir for unfiltered liquid and also serves to collect sediment resulting from filtration. This sediment may be suitably removed by jets of water or steam, &c., and can be discharged into a specially-provided sediment-gutter 11. The orifices 4, Fig. 1, of the filter vessel serve as discharge-openings for the granular mass whenever it shall be desirable to remove the same, the space between an outlet and inlet pocket or individual collection-tubes 16 being such as to permit of a flushing out of this material by means of a stream of water, for example.

A modified form of the ordinary hereinbefore-described outlet-pocket is shown in Fig. 8, in which two collecting-tubes, an upper and a lower one, are provided instead of only one located at the foot of said outlet-pocket, as shown in Fig. 5. This tube is numbered 12$^a$. If an outlet-pocket be equipped with an upper and lower collecting-tube, only the upper one is to be perforated.

Another alternative modification is shown in Figs. 13, 14, and 15, in which an outlet-pocket 6 is equipped with both upper and lower collecting-tubes, and these discharge directly at both ends into suitable troughs or gutters provided for the collection of filtered juices. Each end of said collecting-tubes is herein equipped with a stopper, (shown in detail in Fig. 16,) and whereby it is possible to regulate the flow of the discharged liquid so that the speed of filtration of the entire gravity-filter may be very finely governed and adjusted.

The accompanying inlet-pocket to this modified form of outlet-pocket is shown in Fig. 14, and therein the lower collecting-tube of the inlet-pocket is likewise equipped with the hereinbefore-mentioned stoppers, which discharge into the lower juice-collecting gutter hereinbefore described. The upper collecting-tube of an inlet-pocket of this form is not equipped with stoppers.

The manner of inserting collecting-tubes 16 has been made a part of the specification pertaining to No. 737,850. The collecting-tubes of both inlet and outlet pockets of this invention are inserted into apertures discharging into their respective gutters in a like manner, and it will therefore be unnecessary to specify the disposing of gaskets, stoppers, shoulders, and holding-abutments pertaining thereto.

I claim—

1. An apparatus of the class herein described, comprising a receptacle for the filtering medium, egress and ingress pockets disposed in alternate order, a gutter to which said ingress-pocket delivers and a separate gutter for said egress-pocket, and pockets comprising a lower imperforate collecting-tube, an upper perforate inlet-tube and a perforate collecting-chamber connecting and communicating with said tubes.

2. An apparatus of the class herein described, comprising, a receptacle for the filtering medium, egress and ingress pockets, provided with cap-tubes extending above the filtering medium, disposed in alternate order, a gutter to which said ingress-pocket delivers and a separate gutter for said egress-pocket, and pockets comprising a lower imperforate collecting-tube, an upper perforate inlet-tube and a perforate collecting-chamber connecting and communicating with said tubes.

In testimony whereof I affix my signature in presence of two witnesses.

JOSEF KOŠTÁLEK.

Witnesses:
ADOLPH FISCHER,
LADSLAV VOJÁTEK.